W. D. M. HOWARD.
AUTOMATIC VARIABLE SPEED POWER TRANSMISSION MECHANISM.
APPLICATION FILED APR. 25, 1918.

1,335,168.

Patented Mar. 30, 1920.

INVENTOR
William D. M. Howard.

UNITED STATES PATENT OFFICE.

WILLIAM DAVIS MERRY HOWARD, OF BOSTON, MASSACHUSETTS.

AUTOMATIC VARIABLE-SPEED POWER-TRANSMISSION MECHANISM.

1,335,168.　　　　　Specification of Letters Patent.　　Patented Mar. 30, 1920.

Application filed April 25, 1918. Serial No. 230,743.

*To all whom it may concern:*

Be it known that I, WILLIAM D. M. HOWARD, a citizen of the United States, and a resident of the city of Boston, State of Massachusetts, have made certain new and useful Improvements in Automatic Variable-Speed Power-Transmission Mechanism; and I do hereby declare the following to be a full, clear, concise, and exact description of the same.

The invention contemplates generally, an automatic speed compensating mechanism, for maintaining the equilibrium of a variable load and a given amount of force, sufficient to move the load at variable speeds under variable load conditions.

The invention further contemplates an automatic torque and speed compensating mechanism, for automatically varying the speed of the driven element in relation to the varying load, so as to establish an equilibrium of the load moved by said driven element and a given amount of force, of a driving element, running at a constant speed.

The invention contemplates a mechanical and automatic positive means, for relieving the inverse turning torque of the driven member upon the drive member, by producing a mechanical equilibrium of the opposing forces by decreasing the speed of the driven member and increasing its turning torque.

The invention comprises an automatic mechanism, for the positive transmission of power at variable speeds actuated by the load; comprising a drive and a driven member and connecting means, so that when the application of power by the drive member is constant at given speed, the speed of the drive member will remain constant under the variable loads with a constant transmission of energy.

More particularly the invention comprises a mechanism for the positive transmission of force, automatically compensating the load to the power by decreasing the speed of the load member; thus permitting the power member to operate at constant torque or power.

The transmission is especially adapted for application to a split automobile power transmission shaft, located between an internal combustion prime mover; which must operate at nearly constant speed for efficiency; and the vehicle's tractive members. In this application, the varying tractive resistance of the vehicle will automatically vary the speed of rotation of the driven or load member, establishing an equilibrium between the power and load torques of the drive and driven members, thus permitting the power member to rotate at constant speed with a constant application of power.

Moreover, my invention comprises a power and load compensating mechanism through equalizing the load torque to the power torque by changing the velocity and inertia of the load torque in relation to the power torque, through automatically regulating its speed. The power or energy of the drive member is at all times positively transmitted to the driven member to move same at variable speeds, and the variation of speed is automatically brought about by the variation of the load in relation to the driving force.

Furthermore, my invention relates to a mechanical apparatus to positively transmit power at variable speeds, from a drive to a driven member, automatically actuated by the inertia of the load to be overcome by the driven member.

The transmission is a self-compensating mechanism, operating at different speeds depending on the difference between the turning torque of the power and load shafts, as the load varies in relation to the power application.

The device enables the speed of the drive shaft, with a given application of power to remain constant, under varying loads applied to the driven shaft; the speed of said driven shaft automatically decreasing in direct ratio to the increased resistance of the variable load, as the inertia of the load increases.

My invention, while it is applicable for transmitting power in automobiles, may be used for other purposes.

In this specification and the annexed drawings, I disclose my invention in the form which I consider the best; but I do not limit my invention to such form, as it may be embodied in other forms; and it is to be understood that in and by the claims following the description herein, I intend to cover the invention in whatever form it may be embodied.

The invention consists in the combination with a power (drive) and a load (driven) shaft; having a common axis and centering means; both freely journaled in a floating member forming the mechanism's case, or stabilizer; of two sets of twin eccentric cams, respectively fixed to the driving and driven shafts and carrying eccentric links alternately connected by transverse shafts or pins, which shafts have a confined radial motion oscillating in journals formed in centrifugal weights, which are confined to radial reciprocal motion in guide ways of the transmission case and its cover. Said weights acting in conjunction with springs to resist the centrifugal action thereof, as the load on the driven member and speed of rotation of the case varies, to vary the resistance between the cams and links; and thereby the turning torque and speed of rotation of the driven member.

Referring to the drawing.

Figures 1, 2, 3:
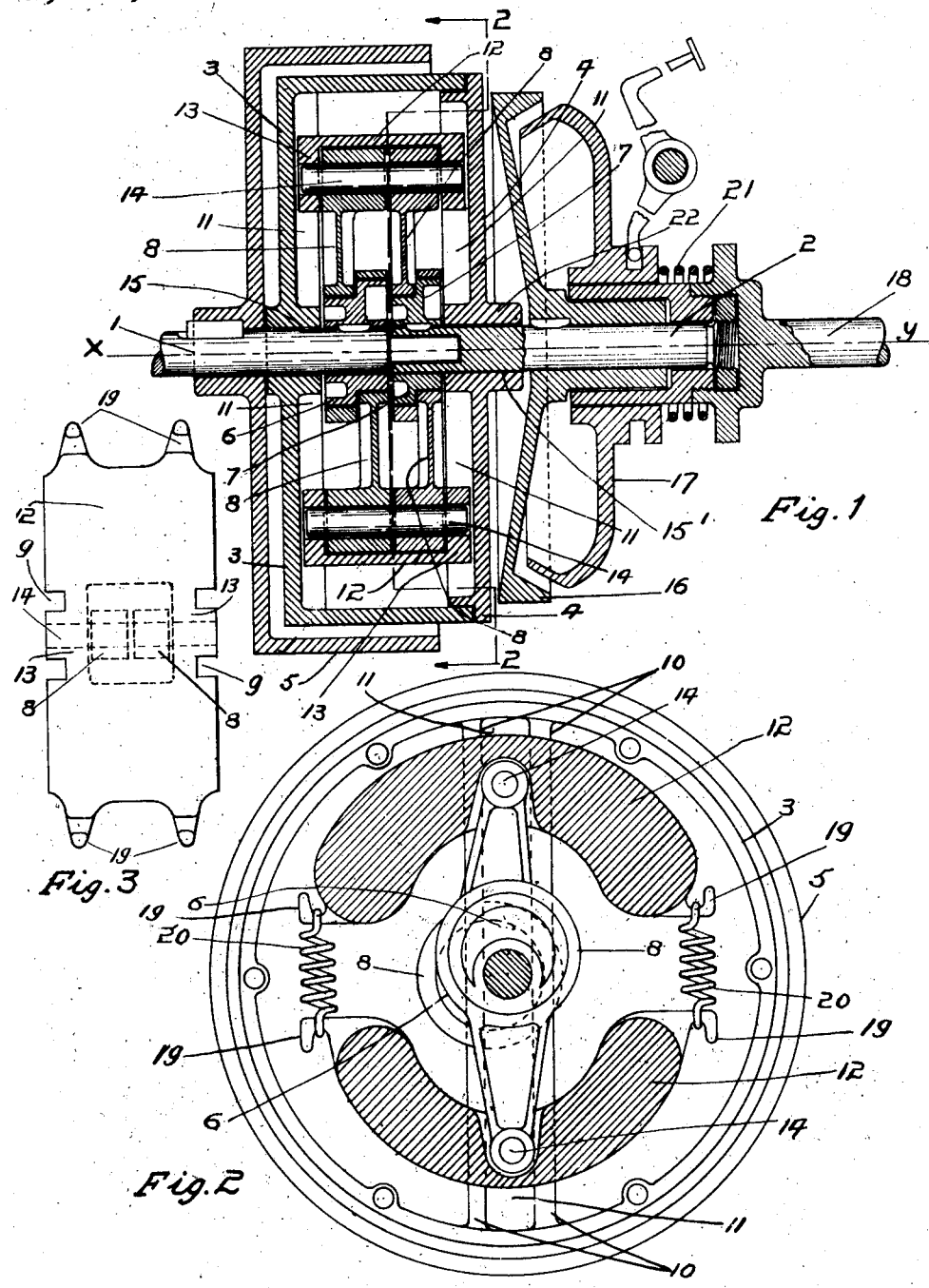
Figure 1 is a longitudinal section of my invention.
Fig. 2 is a transverse sectional view thereof taken on the line 2—2 of Fig. 1.
Fig. 3 is a plan view of one of the centrifugal weights.

In the drawing 3 is a cylindrical transmission case, which is free to revolve around the axis $x\ y$ of the drive shaft 1, and driven shaft 2, and containing the mechanism to be hereinafter described.

The case 3 and the cover 4 have the radial guideways 11 inclosed by the parallel guide rails 10, formed on their inner walls. The case 3 is freely mounted on the drive shaft 1, and the driven shaft 2, and is freely turnable around said shafts passing through the bearings 15 and 15' of the case and its cover respectively.

1 indicates the drive member and 2 the driven member of a split automobile power transmission shaft. The meeting ends of said shaft members are telescoped for centering, and extend within the case 3, being suitably journaled in bearings 15 and 15' respectively.

A twin pair of eccentric cams 6 is keyed to the drive shaft 1, and they have their major axis of eccentricity set at an angle of 90 degrees when their alternate connecting links extend therefrom at an angle of 180 degrees. Or alternatively the major axis of eccentricity of said cams are set at 180 degrees when their respective links extend therefrom at an angle of 90 degrees. (The latter construction not shown).

A duplicate twin pair of eccentric cams 7 is keyed to the driven shaft 2, adjacent to the cam 6, within the case 3.

4 is the cover or outer inclosing end of the case 3 and carries the radial guide rails 10 forming the guideway 11.

The eccentric links 8, are disposed in pairs upon these eccentric cams, and extend outwardly and toward the periphery of the transmission case 3. These links are alternately connected in pairs to the weights 12 by the shafts 14, mounted in bearing boxes formed in their outer ends.

The weights 12 are free to reciprocate radially in the guideways 11 formed by the guide rails 10.

Tension springs 20, connecting the ends of the weights 12, by the hooks 19, draw the weights together and lock the links 8 to their respective cams 6 and 7, thus neutralizing the centrifugal force exerted by the weights in direct ratio to the speed of rotation of the case 3. The speed of rotation of the case 3 and the driven shaft 2 is automatically varied in inverse ratio to the speed of the reciprocating motion of the shafts 14 and weights 12.

The operation of the invention is as follows:—

Upon closing the clutch members 16 and 17, the moment of inertia of the case 3 imparts sufficient turning torque to the driven member 2 to overcome the starting inertia of the car load on the driven member 18. This force is gradually applied because of the opposing and balancing forces exerted by the spring tension and the varying centrifugal pull of the weights 12.

Assuming that the clutch members 16 and 17 are disengaged; the motor vehicle in which the device is installed to be at rest and its internal combustion prime mover is running; then the motor crank shaft and fly wheel 5 keyed thereto, and the drive member 1 revolve as a unit with the case 3 and its internal mechanism.

The extension of the drive shaft 1 passes through the bearing 15 of the transmission case 3 and the drive shaft 1 is keyed to the twin eccentric cam 6, so as to reciprocate the links 8, and also the transverse shafts 14, which pass through the bearings formed in the outer ends of the links 8, having their ends journaled in the centrifugal balancing weights 12. These centrifugal balancing weights will thereby tend to reciprocate in their guideways 11 formed by the guide rails 10 of the case and cover respectively.

Owing to the tension of the springs 20 acting to pull the weights 12 together toward the common axis $x\ y$ of the drive and driven shafts 1 and 2; the action of the centrifugal force exerted by the weights is neutralized and the eccentric cams 6 will rotate more slowly in their links 8, and the shafts 14 will compel the case 3 to rotate with a greater velocity, driving the driven member 2 at greater speed.

If the tensions of the springs in relation to the pull of the centrifugal force balance the load, so as to prevent the rotation of the cams in their respective links, then the shafts 14 with the weights 12 will not reciprocate radially, and all the driving force will be delivered through the rotary motion of the case 3. In this condition all parts will move as a mass and the device will be on direct drive.

Because of the speed of revolution of the case 3 carrying the weights 12 in a rotary direction with it, the centrifugal action of the weights tends to force them radially and outwardly toward the periphery of the case 3, thereby relieving the tension of the springs 20, acting through the links 8 upon the cams to decrease the frictional resistance between their contact faces, and allowing the cams to revolve in their respective links 8, and thereby reciprocating the shafts 14 with the weights 12 in their guideways 11 of the case 3.

This action diminishes the rotative speed of the shafts 14 and the case 3, automatically decreasing the speed of rotation of the case 3 by changing a portion of the velocity of rotation of the case 3 into reciprocating helical motion of the shafts 14.

As the speed of rotation of the case 3 increases, the locking action of the springs 20 through the cams 6 and 7 in conjunction with the links 8 decreases, and the torque and speed of the driven member 2 balances the varying load carried thereby. As the speed of rotation of the shafts 14 increases, so also will that of the case 3 and the centrifugal action of the weights 12 will increase, neutralizing the spring tension, thereby allowing the cams to revolve in their respective links, thus reciprocating the shafts 14 and decreasing the speed of rotation of the case 3, producing a constant equilibrium of forces.

To sum up, the speed of rotation, or the velocity, of the case 3 is regulated by, and is proportional to the inertia of the variable load, driven by the load member 2. This balancing of the forces, to change the speed of rotation of the driven member 2 in inverse ratio to the inertia of the load thereon, actuated by the variable load to be moved, is produced by transforming part of the velocity of rotation of the case 3 into reciprocating motion of shafts 14.

Assuming the clutch members 16 and 17 to be closed, (the car load which upon closing the clutch to be maximum when starting from rest) the load upon the driven shaft 2, and the starting torque also being maximum, then the speed of rotation of the case 3 will automatically be retarded, thereby reducing the centrifugal pull of the weights 12 upon the springs 20, allowing them to act with maximum force to reduce the rotation of the cams of the drive and driven members 1 and 2 in their respective links 8. The turning torque having been overcome, and the load on the driven member 2 decreased as the car's velocity increases, the case is permitted to revolve faster, thereby increasing the speed of rotation of the driven member 2 and the speed of the car.

It is obvious from the above described action that the device is actuated by the load producing a constant balance between the power and the load torques of the drive and driven members, decreasing the speed of rotation of the driven member in direct ratio to the increase of the load thereon, thereby permitting the drive member to run at constant speed with a given application of power.

The car will thus be started from rest, and brought to maximum speed without jar, and with a constant accelerating velocity. When the car is moving at a given speed and a sudden increase of load is met because of encountering a grade, the speed of the car will automatically decrease, allowing the internal combustion prime mover to run at constant speed or accelerate its speed with a constant and increasing power output, without overloading same to the point of reducing its speed, and thus destroying its efficiency. The device permits the motor to run at constant speed with a constant output of power, regardless of the varying tractive loads giving a positive transmission of power, within the power limits of the motor.

As the device is positive in its action, such a load may be applied that the prime mover will finally be stopped. However, this limit of tractive pull would be met with only when the device is delivering its maximum tractive torque.

There is but slight loss in friction, the only loss being in speed, and that is not so much a lower car speed as a higher engine speed. The different graduations of speed and torque are controlled by the relative strength of the power and load torques.

Other features that appeal to those who drive and ride in a car are: All power impulses of the gas engine are eliminated, and the turning effort impressed on the propeller shaft is as uniform and smooth as that from an electric motor. No jars or shocks can be transmitted through the elastic means of transmitting the engine power, as they are absorbed by the inertia of the revolving case.

Furthermore, from the time of starting the car from rest until maximum speed is reached and through all the range of power required from a level road to the worst hills, the power flow between the engine and propeller shaft is never disconnected. The speed of the car is controlled by the throttle and spark and they may be manipulated to handle the car in traffic or on grades in a way to call forth all the power of the engine at just the instant and just as long as it is needed. The car can be held stationary on a grade by its engine power, ready at once to go forward, by operating the throttle, at the maximum speed the grade allows; all without disconnecting the power from the driving shaft.

Further the acceleration is smooth through the car's entire speed range. From a standstill with the engine idling, the car can be smoothly and rapidly brought up to speed of traffic without a jar or jerk. Acceleration is so smooth as to seem less rapid than it really is, and is accomplished without any speeding up of the engine before dropping in the clutch, as is the case when a rapid get-away is made with gear transmission cars.

Another feature is the coasting of the car upon closing the throttle, the principle of operation of the transmission is then reversed, the car drifting with engine idling. This transmission permits a higher engine speed and thus greater power development when the pull should be greatest.

On hills the car does not run more slowly on account of engine slips, but the engine runs more rapidly, thus developing greater horse power and torque. The principle is the same as slipping the clutch in the conventional type of car, with the difference that instead of the energy due to the slips being dissipated in the form of heat in the clutch, which in time will destroy it, the energy thus generated is used in the clutch portion of the device to boost the driving effort of the driven member.

I claim:

1. A power transmission device, including a drive shaft, a driven shaft axially in line, a transmission case with radially extending guideways, within which case the abutting shafts meet and are revoluble, a pair of eccentrics fixed to the drive shaft, a similar pair of eccentrics secured to the driven shaft, short shafts extending across the case into the guideways and journaled in centrifugally actuated weights, tension springs connecting the weights, and links connecting the eccentrics with the radially movable shafts and weights.

2. A means for transmitting power from a prime mover to a variable load in a flexible manner, said means including a drive shaft, a driven shaft, a pair of eccentric cams fixed to the contiguous ends of each of said shafts, a case having parallel guide rails forming radially extending guideways, shafts journaled in centrifugally operated weights guided in the radial guideways, links connecting the eccentric cams with said shafts and weights, and tension springs joining said weights acting to neutralize the centrifugal pull of said weights when rotated to prevent the reciprocation of said links and weights.

3. A power transmission device consisting of a freely revolving case having radial guideways, a drive member, a driven member meeting axially within said case, and freely and independently turnable in journals formed therein, transverse shafts extending into said radial guideways and journaled in weights slidable in the guideways, tension springs joining said weights, eccentrics fixed at right angles upon the drive shaft, eccentrics fixed at right angles upon the driven shaft, and links surrounding said eccentrics and alternately radially extending therefrom and having their ends connected with the radially movable shafts and weights.

4. In a drive mechanism, the combination with two alined shafts, one of which is a drive shaft and the other of which is a driven shaft, of a transmission casing freely revoluble thereon and centrifugally controlled means within the casing for automatically varying the relative speeds of said shafts as the load on the drive shaft varies.

5. In a drive mechanism, the combination with a drive shaft, of a driven shaft in axial alinement with the drive shaft, a transmission casing freely revoluble on said shafts and a centrifugally controlled automatic clutch mechanism inclosed within said casing and connecting said shafts, and by which power is positively transmitted from the drive to the driven shaft at a speed which varies inversely as the load moved by the driven shaft.

6. In a power transmitting mechanism, the combination with a drive shaft and a driven shaft axially in line, of an automatically acting clutch mechanism connecting the shafts, comprising a revolving transmission case with radial guideways, within which case the abutting shaft ends meet and are revoluble, a pair of eccentrics fixed to the drive shaft, a similar pair of eccentrics fixed to the driven shaft, centrifugally controlled weights mounted to radially reciprocate in the case, transverse shafts extending across the case mounted in the weights, and links connecting the eccentrics with the transverse shafts, whereby the relative speed of the drive and driven shafts is altered by altering the direction of motion in the mechanism from rotative motion of the case to reciprocating motion of the weights, to change the fulcrum point in respect to the power element.

7. In a centrifugally controlled automobile power transmission, a drive member, a means for operating the same, a variable speed centrifugally controlled governing mechanism driven thereby, and a driven member operated at variable speeds by said governing mechanism associated therewith, controlled by the variable inertia of the load moved by the driven member, and finally a clutch for disengaging the power from the tractive members.

8. In a power transmitting mechanism, the combination with a drive and driven shaft, of an automatically acting mechanical clutch, comprising eccentric cams keyed to the abutting ends of said shafts within a case freely revoluble around the shafts, eccentric links mounted on said cams and connected to centrifugally controlled weights by transverse pins passing through bearings formed in the heads of said links, radially extending guide rails formed in said case mounting said weights and permitting reciprocating movement of the weights to transform a part of the speed of rotation of the case to reciprocating motion of the weights thereby decreasing the speed of rotation of the driven shaft with constant ratio to the increase of load moved by the driven shaft.

In testimony whereof I have affixed my signature in presence of two witnesses.

WILLIAM DAVIS MERRY HOWARD.

Witnesses:
BEAUFOY HOWARD FOX,
LEO LEWIS GREENWOOD.